US007975292B2

(12) United States Patent
Corella

(10) Patent No.: US 7,975,292 B2
(45) Date of Patent: Jul. 5, 2011

(54) SECURE PASSWORD RESET FOR APPLICATION

(76) Inventor: Francisco Corella, Portland, OR (US)

( * ) Notice: Subject to any disclaimer, the term of this patent is extended or adjusted under 35 U.S.C. 154(b) by 521 days.

(21) Appl. No.: 12/138,409

(22) Filed: Jun. 12, 2008

(65) Prior Publication Data

US 2009/0320107 A1 Dec. 24, 2009

Related U.S. Application Data

(60) Provisional application No. 60/934,269, filed on Jun. 12, 2007.

(51) Int. Cl.
*G06F 7/04* (2006.01)
(52) U.S. Cl. ......... 726/6; 726/4; 726/5; 726/7; 713/168; 713/183
(58) Field of Classification Search .................. 726/4–7; 713/168, 183
See application file for complete search history.

(56) References Cited

U.S. PATENT DOCUMENTS

| 6,339,828 | B1 * | 1/2002 | Grawrock et al. | 713/183 |
|---|---|---|---|---|
| 6,408,389 | B2 * | 6/2002 | Grawrock et al. | 713/183 |
| 2004/0064742 | A1 * | 4/2004 | Excoffier et al. | 713/202 |
| 2007/0016454 | A1 * | 1/2007 | Tipirneni | 705/3 |
| 2007/0157029 | A1 * | 7/2007 | Mani | 713/183 |

OTHER PUBLICATIONS

Wikipedia, Password, Internet—http://en.wikipedia.org/wiki/Password, May 8, 2010, 12 pages.

Ferguson, Best Practices for Your "Forgot Password" Feature, fishnet Security, Mar. 2009, 12 pages.

* cited by examiner

*Primary Examiner* — Kambiz Zand
*Assistant Examiner* — Tongoc Tran
(74) *Attorney, Agent, or Firm* — Dicke, Billig & Czaja, PLLC

(57) ABSTRACT

A method of controlling access to an interaction context of an application, including receiving login requests pertaining to an access account, each login request including a login password to be matched against an access password associated with the access account. A database includes at least one account record including a password state field indicating whether the access password is a temporary password or a permanent password and a security hold field indicating whether a security hold has been placed on the access account by an administrator. Access is denied upon receipt of a login request when the login password fails to match the access password. Access is denied upon receipt of a login request when the login password matches the access password, the password state field indicates that the access password is a permanent password, and the security hold field indicates that there is a security hold on the access account. Access is granted upon receipt of a login request when the login password matches the access password, the password state field indicates that the access password is a permanent password, and the security hold field indicates that there is no security hold on the access account. The method includes granting access which is limited to permitting changing of the access password and prompting a change of the access password upon receipt of a login request when the login password matches the access password and the access password is a temporary password.

6 Claims, 10 Drawing Sheets

SECURE PASSWORD RESET FOR APPLICATION

CROSS-REFERENCE TO RELATED APPLICATION

The subject matter of this application is related to the subject matter of U.S. Provisional Patent Application No. 60/934,269, filed on Jun. 12, 2007, priority to which is claimed under 35 U.S.C. §119(e) and which is incorporated herein by reference.

BACKGROUND

Web applications are computer applications which are accessed by users via a Web browser over a network such as the Internet or an intranet. Often, it is desired to limit or restrict access to a Web application to only valid or registered users. To prevent access to such user-restricted Web applications by unknown or invalid users, users are typically required to login via a Web interface using an associated user ID and user password which provide authentication of the user.

For many reasons, password-based user authentication is the most common means of authentication on the Web. For example, passwords are familiar to users, are easy to use, require no distribution of hardware (e.g., hardware tokens, SSL/TLS client certificates), and require no pre-existing IT infrastructure (e.g., a certification authority that issues and revokes client certificates or a server that validates time-dependent passcodes). A password can be securely transmitted from a Web browser to a Web server using SSL/TLS protocol (Secure Sockets Layer/Transport Layer Security), which provides an encrypted connection after authenticating the server.

However, passwords also have drawbacks. First, for example, passwords have a poor reputation among security professionals as being susceptible to being guessed by an online attacker because they generally have low entropy (i.e., low degree of randomness), and because they are often reused by users at multiple Web sites. Second, users can be locked out (i.e., the user is not allowed to login) from their accounts with Web applications by forgetting their password (or another component of the user's login credential, such as a user ID), or by a security mechanism that limits a number of incorrect password attempts that can be made against the password of a user account, which may occur if the user repeatedly mistypes or forgets his/her password or if an attacker attempts to gain access to the user's account.

To address the user lock-out problem, many Web sites and Web applications employ "security questions" as an alternative login mechanism. According to such techniques, when a user creates his/her user account, the user chooses one or more questions, the answers to which the user is unlikely to forget. Later, if the user cannot log in, the user is allowed to authenticate himself/herself by answering the security questions.

However, employing a single security question whose answer is publicly known information, such as the traditional "mother's maiden name" question, essentially amounts to a security hole. Even a single question whose answer is not public information is insecure since the answer is generally low entropy, often being a single word found in a dictionary and whose range is further restricted by the question itself. Even multiple security questions may provide less entropy than a password. Furthermore, it is still possible that a user will forget an answer to a security question or repeatedly mistype an answer and, thus, remain locked out of his/her account.

Another technique to address the lock-out problem, which was developed by IT organizations long before the existence of the Web, is to have the user contact an administrator or help desk when he/she is locked out. Upon being contacted, the IT organization resets the user's password to a temporary password that the user can later change to a password known only to the user. Such a solution relies on the availability of a confidential, "out-of-band" communications channel via which the IT organization can communicate the temporary password to the user. Such a channel may be, for example, an internal e-mail deemed to be confidential, a telephone conversation, or a face-to-face meeting, for instance. However, such a technique is rarely employed on the Web because there is generally no such confidential, out-of-band communication channel between an administrator and a user.

SUMMARY

One embodiment provides a method of controlling access to an interaction context of an application, including receiving login requests pertaining to an access account. Each login request includes a login password to be matched against an access password associated with the access account. A database includes at least one account record including a password state field indicating whether the access password is a temporary password or a permanent password and a security hold field indicating whether a security hold has been placed on the access account by an administrator. Access is denied upon receipt of a login request when the login password fails to match the access password. Access is denied upon receipt of a login request when the login password matches the access password, the password state field indicates that the access password is a permanent password, and the security hold field indicates that there is a security hold on the access account. Access is granted upon receipt of a login request when the login password matches the access password, the password state field indicates that the access password is a permanent password, and the security hold field indicates that there is no security hold on the access account. The method includes granting access which is limited to permitting changing of the access password and prompting a change of the access password upon receipt of a login request when the login password matches the access password and the access password is a temporary password.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. It is to be understood that the features of the various exemplary embodiments described herein may be combined with each other, unless specifically noted otherwise. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Figure 1:
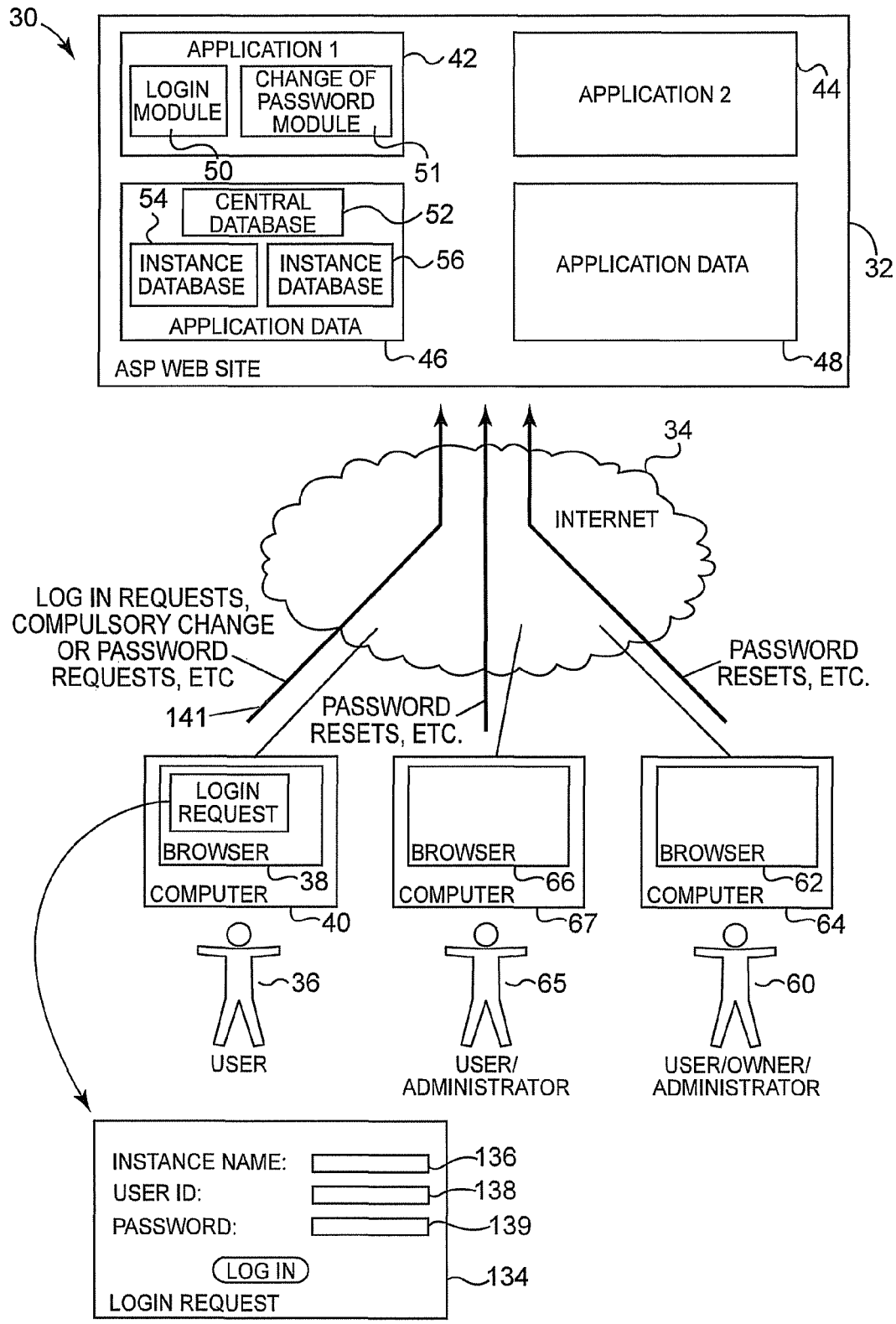
FIG. 1 is a block diagram generally illustrating an example of a system for operating a Web application according to one embodiment.

FIG. 1 is a block diagram generally illustrating an example of a system 30 for operating a multi-instance, multi-user Web application employing techniques to enable secure reset of a password of a user's account of the Web application, including using a security hold feature according to embodiments described herein. According to one embodiment, when a user's password is reset to a temporary password, which may occur due to the user forgetting his/her password or to a security mechanism that limits a number of incorrect login attempts against the password, for example, a security hold is placed on the user's account. According to one embodiment, the security hold allows access to the user's account only for the purpose of changing the temporary password to permanent password. Only upon verification that the user has changed the temporary password to a permanent password, such as through contact with an administrator of the application, for example, is the security hold on the account lifted and normal access privileges reinstated.

According to one embodiment, as illustrated by FIG. 1, system 30 includes an application service provider (ASP) Web site 32 which is accessible over a network such as the Internet, as illustrated at 34, by at least one user, such as user 36, via a browser 38 residing on a computer 40 (e.g., a PC). It is noted that ASP Web site 32 may reside on a single computer (e.g., a server computer) or on multiple computers which may be remotely located relative to one another.

According to one embodiment, ASP Web site 32 includes one or more applications, such as applications 42 and 44, wherein each application is a software application for performing desired operation, and application data corresponding to each application, such as application data 46 and 48 respectively corresponding to applications 42 and 44.

According to one embodiment, applications further include a login module and change-of-password module, such as login module 50 and change-of-password module 51 of application 42, which are configured to control access to an application, such as application 42, to valid users and, according to one embodiment, employing a security hold mechanism as mentioned above. In one embodiment, each application data includes a central database, and one or more instance databases, one for each virtual application instance, such as central database 52, instance database 54, and instance database 56 of application data 46.

According to one embodiment, each virtual application instance (which will be described in greater detail below by FIGS. 2 and 5) associated with an application, such as application 42, is created by a user, who is referred to as an owner. In one embodiment, for example, a virtual application instance (such as virtual application instance of FIG. 5) is created by a user/owner/administrator 60, such as over Internet 34 via a browser 62 residing on a computer 64. According to one embodiment, only user/owner/administrator 60 registers with the ASP, while other users, such as user 36, are granted access to the virtual application instance by administrators. User/owner/administrator 60 serves as an administrator of the virtual application instance (e.g., creating, deleting, and managing user accounts) and may grant administrative privileges to other users. For example, according to one embodiment, user/owner/administrator 60 grants administrative privileges to a user/administrator 65, who accesses ASP Web site 32 via a browser 66 on a computer 67. The above arrangement comprises a three-level hierarchy for an application instance, including unprivileged users (e.g., user 36), user administrators (e.g., user/administrator 65), and the user/owner/administrator (e.g., user/owner/administrator 60).

Figure 2:
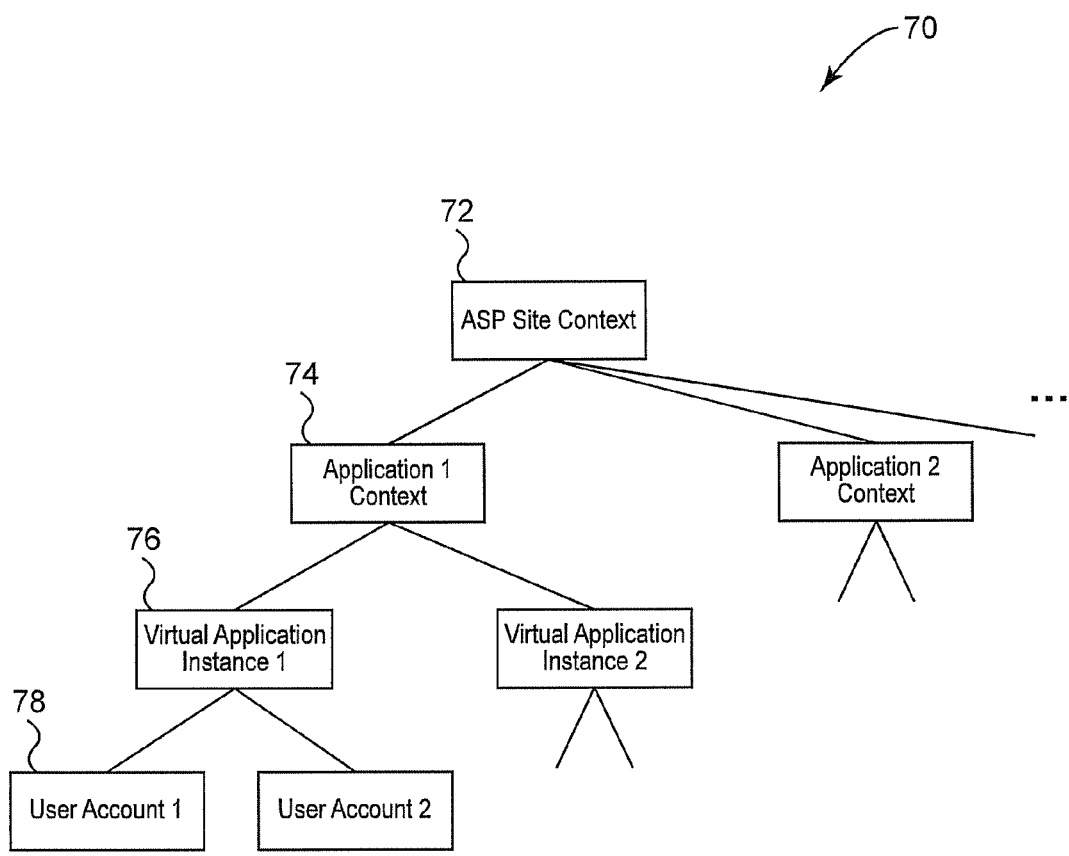
FIG. 2 is a tree diagram illustrating interaction contexts of a user with a website according to one embodiment.

Each interaction of user 36 with ASP Web site 32 takes place within an "interaction context." FIG. 2 is a tree diagram 70 illustrating such interaction contexts according to one embodiment. Each box in FIG. 2 represents an interaction context, with a line between two interaction contexts indicating that the upper box or interaction context is more general than the lower box or interaction context. For example, the box indicated at 72 represents a more general interaction context than the interaction context represented by box 74, with the interaction context represented by box 74 being a sub-context of the interaction context represented by box 72.

With reference to FIG. 1, all interactions with ASP Web site 32 take place within ASP Site Context 72. As illustrated by FIG. 1, ASP Web site 32 provides one or more applications, such as first application 42 and second application 44, for use by users, such as user 36. When a user, such as user 36, uses an application, such as first application 42, the interactions of the user with ASP Web site 32 take place within an application context, such as application 1 context, as indicated at 74.

When user 36 logs in to an application, such as first application 42, such as by submitting a login form, such as login form 134 of FIG. 1, subsequent interactions take place within the context of a "virtual application instance" specified by an instance name input 136 of login form 134. A virtual application instance is a particular kind of interaction context, such as a virtual application instance as indicated at 76. According to one embodiment, when a user, such as user 36, logs in by submitting login form 134, user 36 more specifically logs in to a user account as specified by login ID input 138 of login form 134. Subsequent interactions, thus, also take place within a more specific interaction context provided by the user account. A user account, such as user account 1 at 78, is a particular kind of interaction context which is more specific than a virtual application instance, such as virtual application instance 76.

In one embodiment, where login forms, such as login form 134, are not specific to a particular virtual application instance, there are no interactions that take place within the context of a virtual application instance without also taking place within the context of a user account. However, there are alternative embodiments. In one embodiment, a user first selects a particular virtual application instance using an instance-selection form. The browser then downloads a page containing a login form that is specific to the selected virtual application instance. Then the user uses this instance-specific login form to log in to the selected virtual application instance, by providing a user ID and a password. In such an embodiment, the interactions of downloading the page containing the instance-specific login form and of submitting the instance-specific login form take place in the interaction context of the selected virtual application instance, such as application interaction context 76, without taking place in the interaction context of any particular user account. Again in this embodiment, the interactions of downloading the page containing the instance-selection form, and of submitting the instance-selection form, take place within the interaction context of an application without taking place in the interaction context of any particular virtual application instance. In an embodiment that uses a login form, such as login form 134, the interactions of downloading the page that contains the (non-instance-specific) login form 134 and of submitting the form also take place in the interaction context 74 of an application without taking place in the interaction context of any particular virtual application instance.

Figure 3:
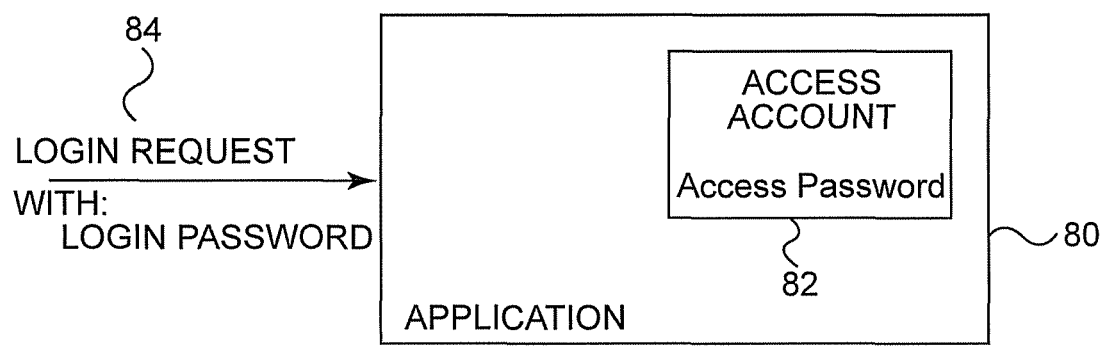
FIG. 3 is a block diagram generally illustrating an application having an access account including an access password.
Figure 4:
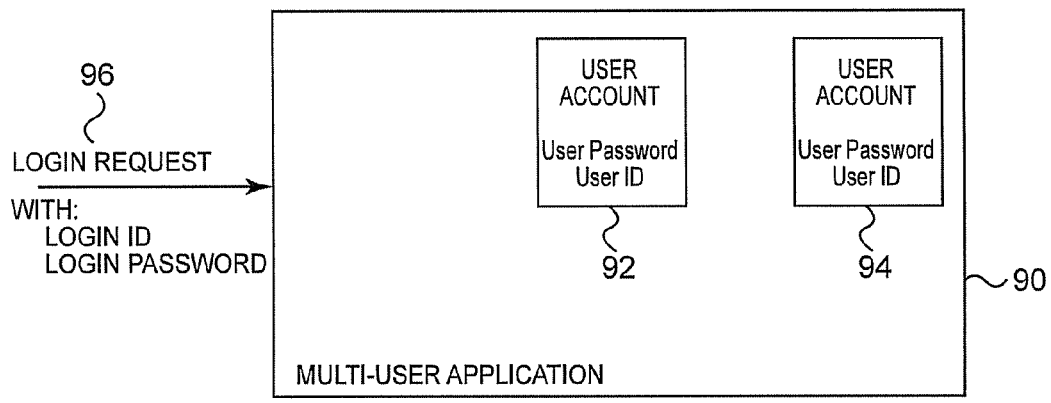
FIG. 4 is a block diagram generally illustrating a multi-user application having a plurality of user accounts.
Figure 5:
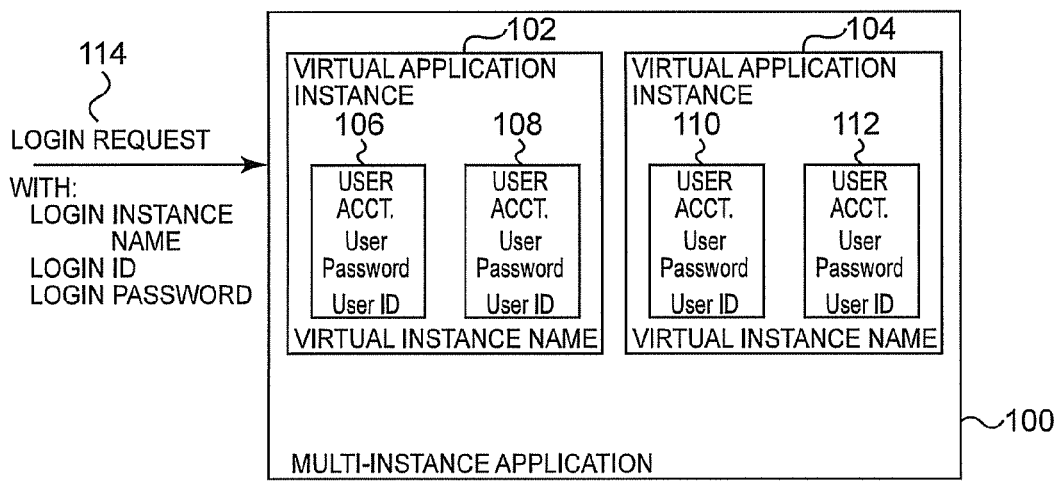
FIG. 5 is a block diagram generally illustrating a multi-user, multi-instance application including a plurality of virtual application instances, each virtual application instance including one or more user accounts.

Embodiments for resetting a user's password employing a security hold mechanism are described in detail herein with respect to a multi-instance, multi-user Web application. However, embodiments include other suitable application types for which resetting of passwords includes a security hold mechanism. FIGS. 3 through 5 below briefly illustrate examples of such suitable application types.

For example, FIG. 3 generally illustrates an application 80 having an access account 82 including an access password. Application 80 is accessed by a user via submission of a login request, as indicated at 84, including a login password. Access is granted to application 80 upon receipt of a login request 84 having a login password matching the access password of access account 82.

FIG. 4 generally illustrates a multi-user application 90 having a plurality of user accounts, such as user accounts 92 and 94, each user account including a user ID and a user password. Access is granted to multi-user application 90 within a user account upon receipt of a login request 96 having a login ID and login password respectively matching a user password and user ID of the user account, such as user account 92.

FIG. 5 illustrates a multi-user, multi-instance application 100 including a plurality of virtual application instances, such as virtual application instances 102 and 104, each virtual application instance having a virtual instance name. Each virtual application instance includes one or more user accounts, such as user accounts 106 and 108 of virtual application instance 102 and user accounts 110 and 112 of virtual application instance 104, with each user account having a user ID and a user password. Access is granted to a virtual application instance within a user account, such as user account 106 of virtual application instance 102, upon receipt of a login request 114 having a login instance name matching the virtual instance name of virtual application instance 102 and a login ID and a login password respectively matching the user ID and user password of user account 106.

In one embodiment, multi-instance, multi-user application 100 is implemented as a Web application, such as applications 42 and 44 of FIG. 1, for example. According to such an embodiment, each virtual application instance, such as virtual application instances 102 and 104, has a corresponding instance database, such as instance databases 54 and 56, for example.

Figure 6:
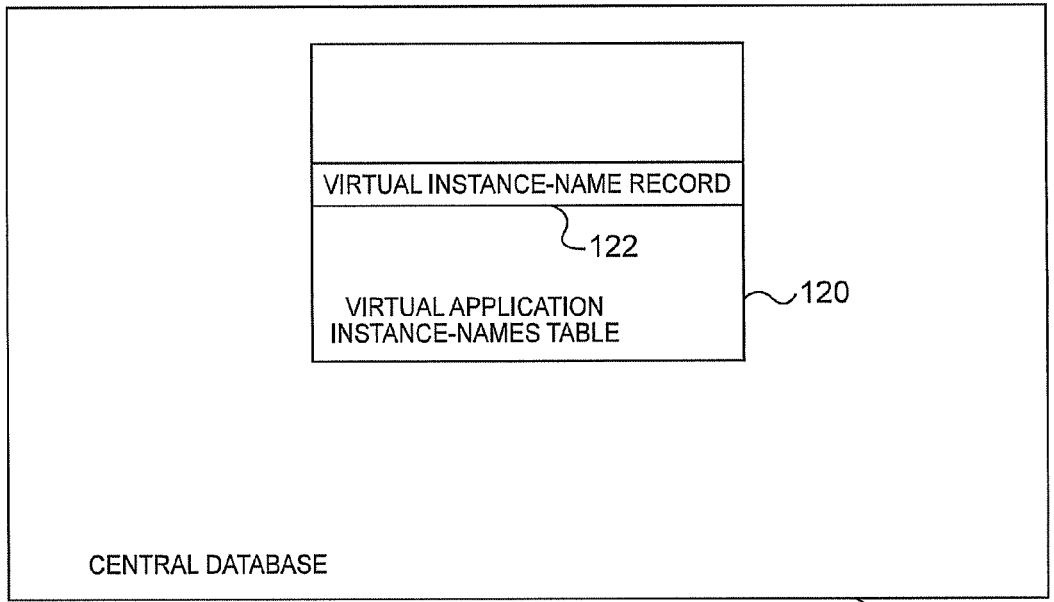
FIG. 6 is a block diagram generally illustrating a central database according to one embodiment.
Figure 7:
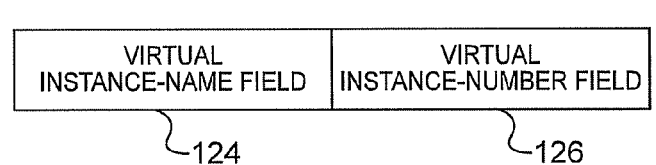
FIG. 7 is a block diagram generally illustrating an instance-name record according to one embodiment.

FIG. 6 illustrates one embodiment of a central database 52 of the system 30 illustrated in FIGS. 1 and 2. As illustrated in FIG. 6, central database 52 includes a virtual application instance-names table 120, with table 120 including one or more virtual instance-name records, such as virtual instance-name record 122. In turn, according to one embodiment, as illustrated by FIG. 7, each virtual instance-name record, such as virtual instance-name record 122 includes a virtual instance-name field 124, which serves as a primary key, and a virtual instance-number field 126. According to one embodiment, login module 50 employs the virtual instance-name records of central database 52, such as virtual instance-name record 122, to map a virtual instance name (e.g., virtual instance-name field 124) to a virtual instance number (e.g., virtual instance-number field 126) which, in-turn, is used to locate the corresponding instance database (e.g., instance database 54 corresponding to virtual application instance 102).

Figure 8:
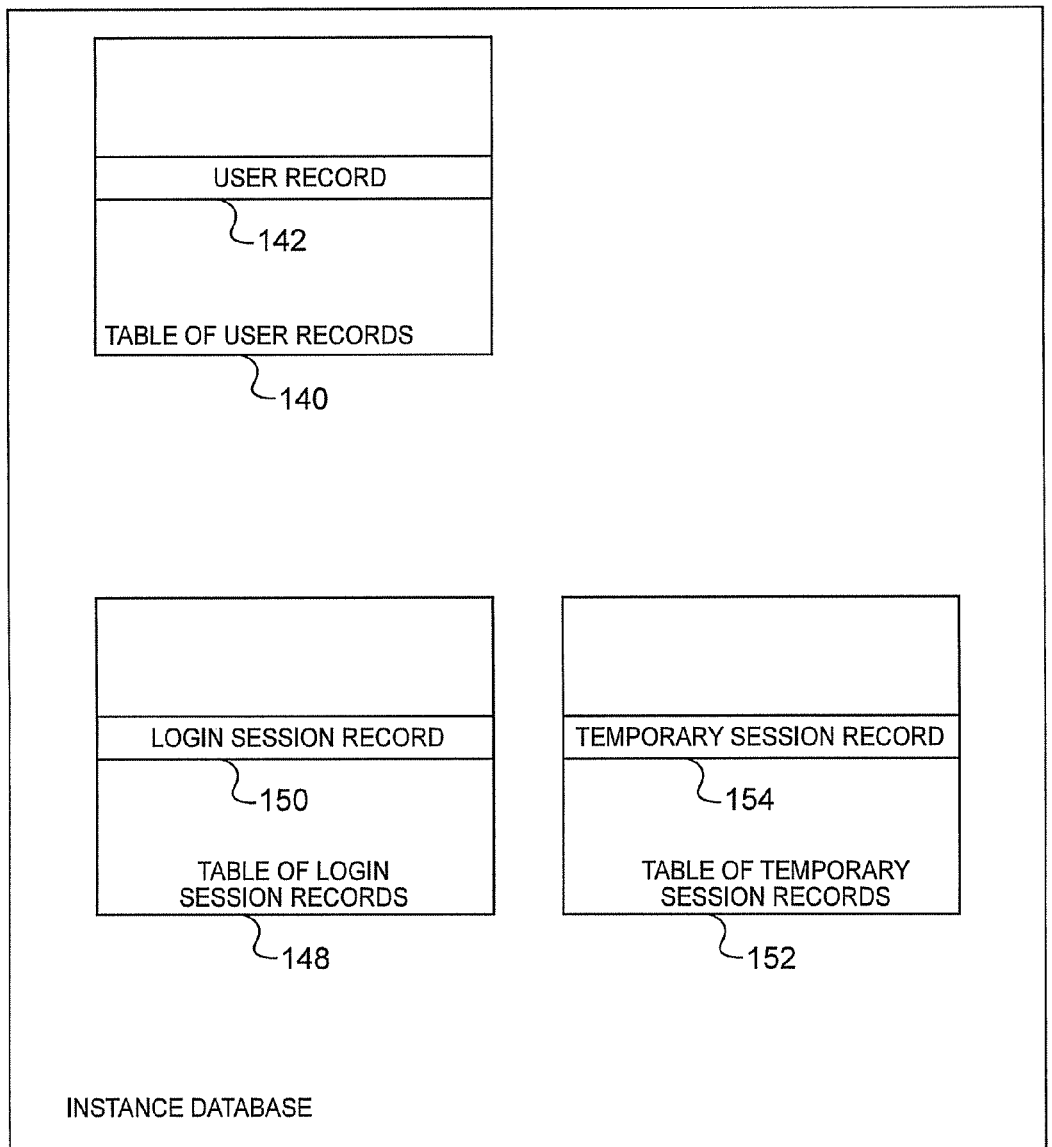
FIG. 8 is a block diagram generally illustrating an instance-database according to one embodiment.

As illustrated by FIG. 8, according to one embodiment, each instance data base, such as instance database 54, includes a table of user records 140 having one or more user records 142 (one for each user, such as user 36), a table of login session records 148 having one or more login session records 150, and a table of temporary session records 152 having one or more temporary session records 154. According to one embodiment, as is described in greater detail below, each instance database, such as instance database 54, tracks users of virtual application instances, such as user 36 of virtual application instance 102, and uses non-persistent cookies to associate HTTP requests with sessions, temporary sessions being used to authenticate compulsory-change-of-password requests, and login sessions being use to authenticate all other requests.

Figure 9:
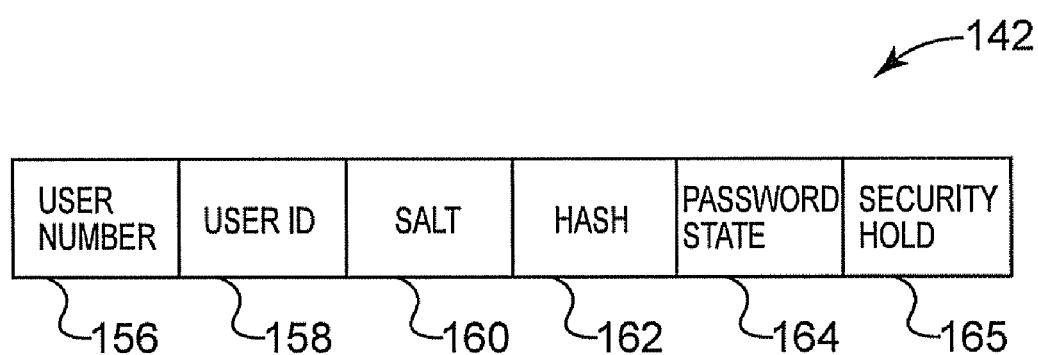
FIG. 9 is a block diagram generally illustrating a user record according to one embodiment.

As illustrated by FIG. 9, according to one embodiment, each user record 142 includes a user number field 156, which serves as a primary key, a user ID field 158, containing the user's User ID, a salt field 160, wherein a "salt" comprises a random value, and a hash field 162, containing a "hash" of the concatenation of the salt and the user's password as computed by a cryptographic hash algorithm (e.g., "SHA1"). In other embodiments, in lieu of salt field 160 and hash field 162, user record 142 may simply include a password field containing the user's password. As used herein, the "hash of a data item" means "the hash of that data item computed by the cryptographic hash algorithm," and the "hash of a salt and a password" means "the hash of the concatenation of the salt and the password as computed by the cryptographic algorithm."

According to the embodiment of FIG. 9, user record 142 further includes a password-state field 164 which indicates whether the current user password is a temporary password (e.g., as reset by an administrator, such as administrator 60, and to be changed by the user, such as user 36) or a permanent password (i.e., chosen by the user), and a security hold field 165 which indicates whether a security hold, as will be described in greater detail below, has been placed on the user's account by an administrator.

Figure 10:
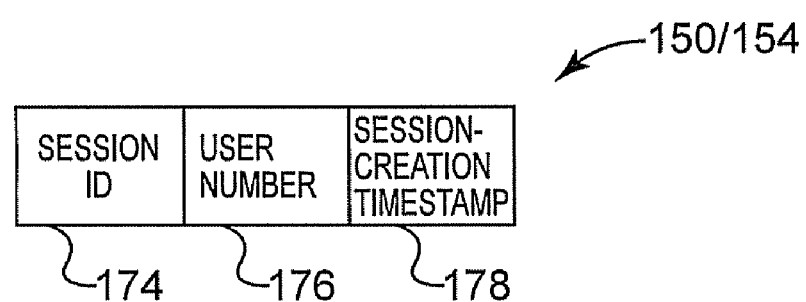
FIG. 10 is a block diagram generally illustrating a login/temporary session record according to one embodiment.

FIG. 10 illustrates one embodiment for both a login-session record 150 and a temporary-session record 154 of instance database 54. As illustrated, both login session record 150 and temporary session record 154 include a session ID field 174, which serves as a primary key, a user number field 176 through which the session record refers to a user record, such as user record 142, and a session-creation timestamp 178 that records the time when the session was initiated and is used to implement session expiration. A session is deemed to have expired if the age of the session record exceeds an allowed session lifetime.

Figure 11:
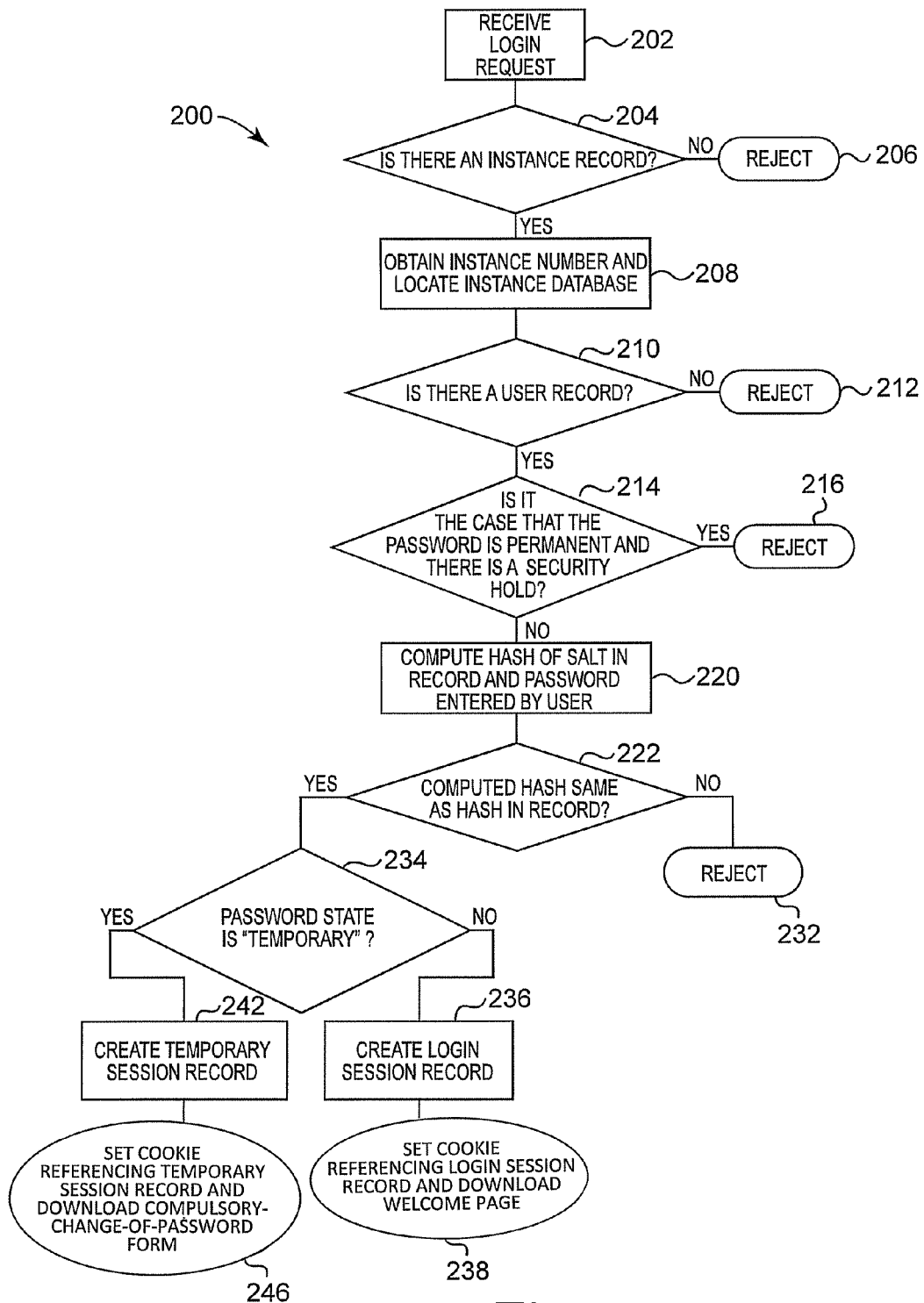
FIG. 11 is a flow diagram illustrating a login process according to one embodiment.

FIG. 11 is a flow diagram illustrating one embodiment of a login validation process 200 employed by a login module of a Web application, such as login module 50 of application 42. With reference to FIGS. 1 and 11, process 200 begins at 202 with a receipt of a login form submitted by a user, such as login form 134 submitted by user 36. According to one embodiment, login form 134 is an HTML form having three data inputs: an instance name input 136, a User ID input 138, and a password input 139. According to one embodiment, the virtual application instance name is chosen and can be changed by the user who creates the instance and becomes its owner, such as owner 60, and is a secret known only to the users of the instance. Similarly, according to one embodiment, the user's User ID is chosen by the administrator who creates the user's user account and can be change by an administrator. The password is known only to the user.

After filling out login form 134, the login request is transmitted from browser 38 to ASP Web site 32 (e.g., to a server computer) in an HTTP request. The login request and all subsequent HTTP requests are transmitted over an SSL connection, as indicated at 141, which employs SSL/TLS protocol to encrypt connection 141 to ASP Web site 32 after authenticating the computer system at the other end of connection 141 as one used by ASP Web site 32.

As illustrated in FIG. 11, after receiving the data entered via login form 134, process 200 proceeds to 204 where it queries, such as via login module 50, whether any virtual instance name record 122 in central database 52 has a virtual instance name field 124 that contains a virtual instance name that matches the virtual instance name entered in the instance name input 136 of login form 134. If the answer to the query at 204 is "no" (i.e., no such virtual instance name record 122 is found in central database 52), login module 50 rejects the login attempt as being invalid, as indicated at 206.

If the answer to the query at 204 is "yes" (i.e., such a virtual instance name record 122 is found in central database 52), process 200 proceeds to 208 where login module 50 uses the virtual instance number found in virtual instance number field 126 of the virtual instance name record 122 to locate the corresponding instance database, such as instance database 54. Subsequently, at 210, process 200 queries whether any user record 142 in the table of user records 140 of the corresponding instance database, such as instance database 54, has a User ID field 158 that contains a User ID that matches the User ID entered in the User ID input 138 of login form 134. If the answer to the query at 210 is "no" (i.e., no such user record 142 is found in the instance database), login module 50 rejects the login attempt as being invalid, as indicated at 212.

If the answer to the query at 210 is "yes" (i.e., such a user record is found in the instance database), process 200 proceeds to 214 where it queries whether the password is permanent by checking password-state field 164 of user record 142 and whether the user account corresponding to the matching user record found at 210 has a security hold by checking security hold field 165 of user record 142. The answer to the query at 214 is "yes" if the password-state field 164 indicates that the password is permanent and the security hold field 165 indicates that a security hold is placed on the user's account by an administrator. If the answer to the query at 214 is "yes" the login attempt is rejected, as indicated at 216.

The answer to the query at 214 is "no" if the password-state field 164 indicates that the password is temporary or if the security hold field 165 indicates that no security hold is placed on the user's account. If the answer to the query at 214 is "no" process 200 proceeds to 220. It is noted that if the password is temporary, the query at 214 is "no" regardless of the state of the security hold field 165.

At 220 login module 50 computes the hash of the salt stored in salt field 160 of user record 139 and the password entered by the user in password input 140 of login form 134. At 222, process 200 queries whether the computed hash matches the hash contained in hash field 162 of user record 142. If the answer to the query at 222 is "no", process 200 rejects the login attempt as indicated at 232.

If the answer to the query at 222 is "yes", the login attempt is deemed valid and process 200 proceeds to 234 where it queries whether the password is a temporary password by checking the value of password state field 164 of user record 142. If the answer to the query at 234 is "no", process 200 proceeds to 236 wherein login module 50 generates a random session ID and adds a login session record 150 to the table of login session records 148 of the instance database 54, the record containing the session ID in field 174, the user number found in the matching user record 142 in field 176, and a timestamp in field 178.

Figure 12:
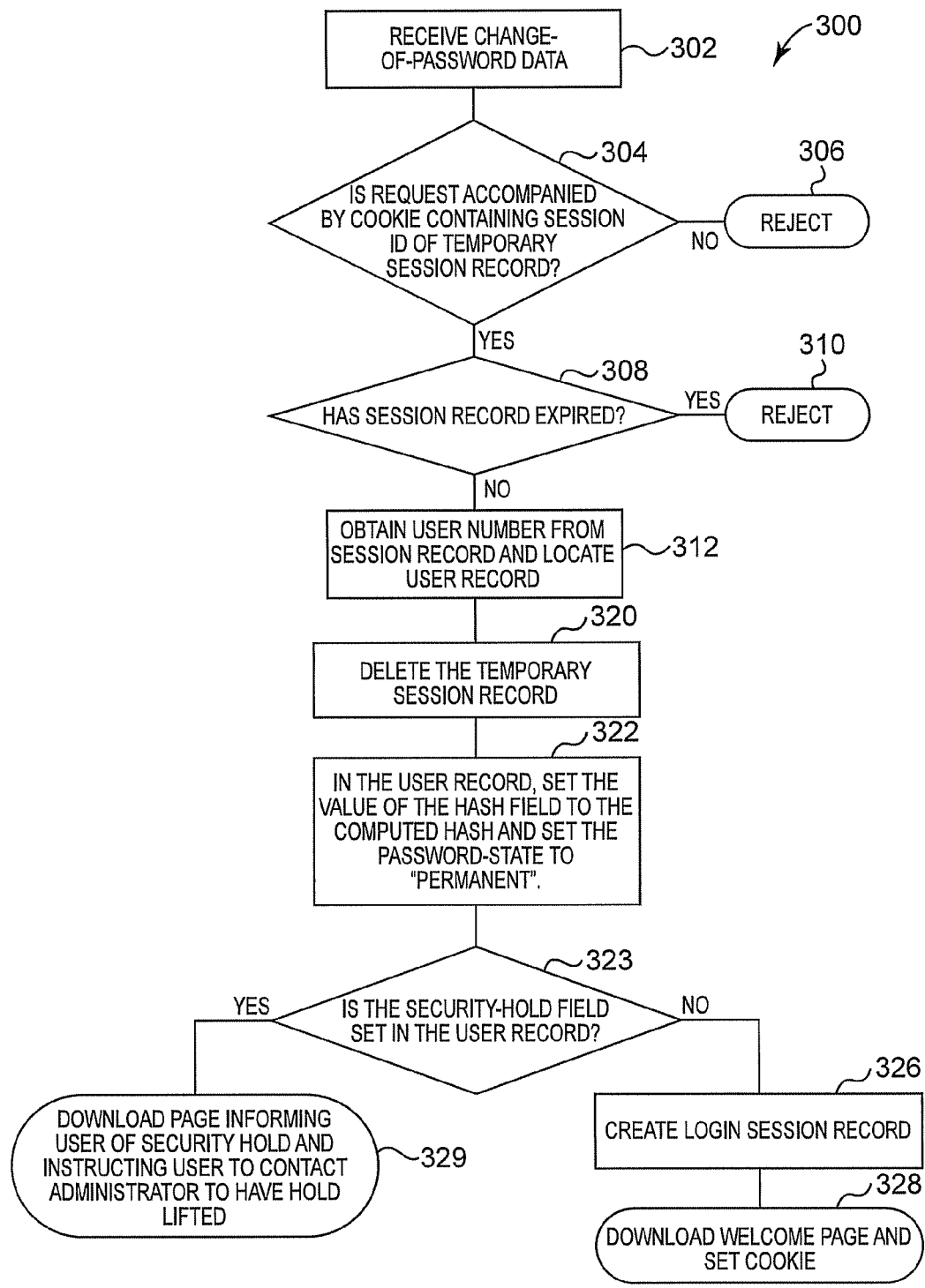
FIG. 12 is a flow diagram illustrating a compulsory password reset process according to one embodiment.

At 238, a welcome page is downloaded and a cookie containing the session ID as its value is set in the user's browser, such as browser 38 of user 36. The cookie is returned to Web application 32 by browser 38 with each subsequent HTTP request A request to access the virtual application instance, other than a compulsory-change-of-password request, is authenticated by verifying that the session ID contained in the cookie that accompanies the request matches the session ID field 174 of a login session record. (A compulsory-change-of-password request is authenticated by a temporary session record, rather than by a login session record, as described in greater detail below.) If the answer to the query at 234 is "yes", process 200 proceeds to 242 wherein login module 50 generates a random session ID and adds a temporary session record 154 to the table of login session records 152 of the instance database 54, the record containing the session ID in field 174, the user number found in the matching user record 142 in field 176, and a timestamp in field 178. Subsequently, at 246, a cookie is set in the user's browser, and a compulsory change of password page (see FIG. 12 below) is downloaded via which the user must submit a compulsory-change-of-password request to replace the current password with a new password. FIG. 12 is a flow diagram illustrating one embodiment of a compulsory change of password process 300 employed by a change of password module, such as change of password module 51 of application 42 to process a compulsory-change-of-password request. Process 300 begins at 302 with receipt of data entered received via the compulsory change-of-password request HTTP provided at 246 of FIG. 11, including a new password. At 304, process 300 authenticates the change-of-password request by querying whether it is accompanied by a cookie containing a session ID of a temporary session record 154. (Is is noted that a temporary session record is employed for authentication rather than a login session record.) If the answer to the query at 304 is "no", the change-of-password request is rejected, as indicated at 306. If the answer to the query at 304 is "yes", process 300 proceeds to 308 wherein, based on session-creation timestamp field 178, it queries whether temporary session record 154 has expired. If the answer to the query at 308 is "yes", the change-of-password request is rejected, as indicated at 310.

If the answer to the query at 308 is "no", process 300 proceeds to 312 where the user's user number is obtained from user number field 176 of temporary session record 154 and used to locate the corresponding user record 142 from user record table 140 of instance database 54. Subsequently, at 320, the temporary session record 154 is deleted from the table of temporary session records 152.

Process 300 then proceeds to 322, where change of password module 51 changes the password of the user to the new password by computing the hash of the salt stored in salt field 160 of the corresponding user record 142 and the new password and storing the computed hash in hash field 162 of the user record. Additionally, the password state field 164 is set to indicate that the password is a permanent password. It is noted that the user can voluntarily change his/her password at any time.

At 323, process 300 queries whether there is a security hold on the user's account by checking to see whether the security hold field of the user's user record is set, such as security hold field 165 of user record 142. If the answer to the query at 323 is "no", there is not a security hold and process 300 proceeds to 326, where a login session record 150 is created and added to the table of login session records 148, including the same session ID as the temporary session record 154 in the session ID field 174. At 328, the welcome page is downloaded to the user's browser, such as browser 38 of user 36.

If the answer to the query at 323 is "yes", there is a security hold and process 300 proceeds to 329 where a notification page is downloaded to the user's browser, such as browser 38 of user 36, informing the user of the security hold on his/her account and instructing the user to contact an administrator, such as administrator 60, to have the security hold lifted.

In one embodiment, when an administrator receives the user's request to lift the security hold, the administrator verifies that the request comes from the legitimate user and that the user has successfully changed the temporary password, before acting upon the request.

In one example scenario, an attacker may snoop the temporary password and use it to log in before the legitimate user. The attacker is then taken to the compulsory-change-of-password page, and can change the temporary password to a permanent one. However, if the administrator has placed a security hold on the account, the attacker cannot further access the account until the hold is lifted; if the attacker tries to log in again, with any password, the login is rejected as invalid. The attacker may ask an administrator to lift the security hold, but it is assumed that an administrator will not grant the request if it does not come from the legitimate user. The legitimate user may try to log in, but will not be able to do so, and will contact an administrator to complain about this. The administrator will not lift the security hold, because administrators are instructed to only lift the security hold if the legitimate user has been able to change his/her password, which is not the case. The administrator will instead reset the password again and send a new temporary password to the user, thus foiling the attack.

Embodiments of this mechanism rely on the fact that the administrator can verify the identity of the user when the user makes the request that the security hold be lifted. In one embodiment, the above-described three-level hierarchy permits the owner to create administrator accounts so that each user is personally known to an administrator. When the administrator knows the user, the administrator can easily verify the user's identity; for example, the administrator may recognize the sound of the user's voice during a phone conversation, or ascertain the user's identity in an exchange of email messages.

In more general terms, security-hold mechanism embodiments can be viewed as lowering the security requirements placed on the communication channel between the user and the administrator. Without the security hold, a channel with confidentiality protection is needed, so that the administrator can send the temporary password to the user without revealing it to an attacker. In embodiments employing the security hold, all that is needed is a channel that provides data-origin authentication (with replay protection) for messages from the user to the administrator, so that the administrator can verify that the request to lift the security hold comes from the legitimate user.

Figure 13:
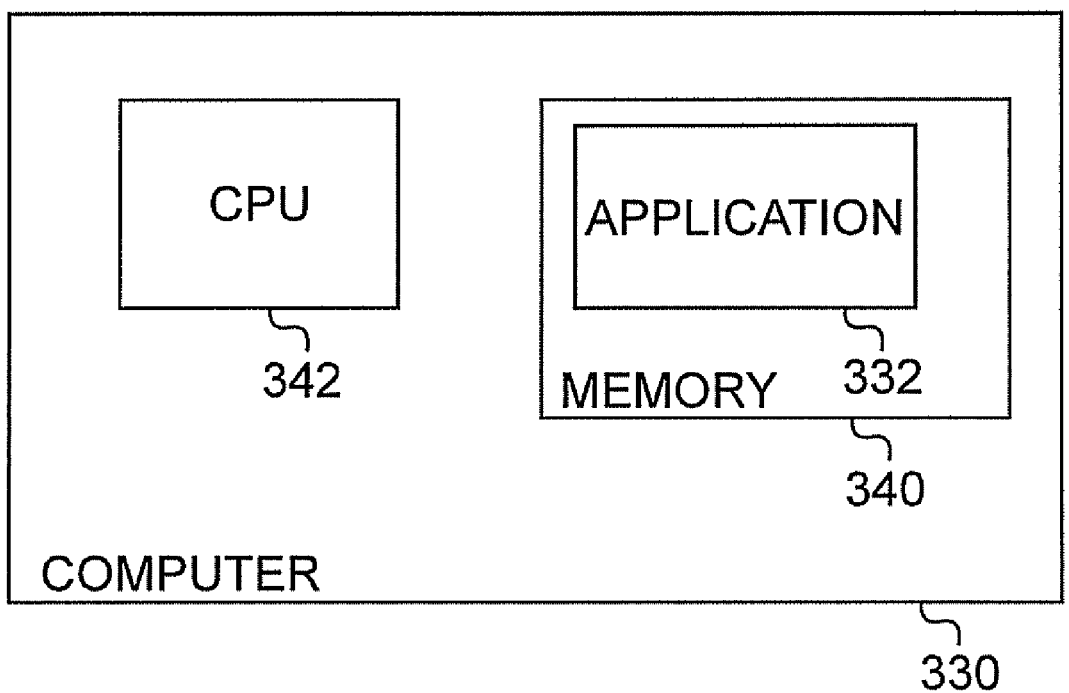
FIG. 13 is a block diagram of a computer system according to one embodiment.

FIG. 13 is a block diagram generally illustrating a computer system 330 for implementing an example application 332 (e.g., applications 42 and 44 of ASP Web site 32 illustrated in FIG. 1). One embodiment of computer system 330 is a server computer. As illustrated, according to one embodiment, application 332 is stored in a memory 340 and operable by a central processing unit (CPU) 342 of computer system 330. According to one embodiment, portions of application 332 may be stored in memories of multiple computers.

As such, components of embodiments can be implemented in hardware via a microprocessor, programmable logic, or state machine, in firmware, or in software with a given device. In one embodiment, at least a portion of the software programming is web-based and written in the PERL programming languages, including links to Web server software, such as Apache, and each of the main components may communicate via a network using a communication protocol. For example, embodiments may or may not use a TCP/IP protocol for data transport between browsers and servers and between computers within the ASP Web Site. Other programming languages and communication protocols suitable for use with embodiments will become apparent to those skilled in the art after reading the present application. Components of embodiments may also reside in software on one or more computer-readable mediums, which is defined herein to include any kind of memory, volatile or non-volatile, removable or non-removable, such as floppy disks, hard drives, read-only memory (ROM), CD-ROMs, flash memory, and random access memory (RAM).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling access to an interaction context of an application, the method comprising:

receiving login requests pertaining to an access account, including a login request, each login request including a login password to be matched against an access password associated with the access account;

maintaining a database comprising at least one account record including a password state field indicating whether the access password is a temporary password or a permanent password and a security hold field indicating whether a security hold has been placed on the access account by an administrator;

denying access upon receipt of the login request when the login password fails to match the access password;

denying access upon receipt of the login request when the login password matches the access password, the password state field indicates that the access password is a permanent password, and the security hold field indicates that there is a security hold on the access account;

granting access upon receipt of the login request when the login password matches the access password, the password state field indicates that the access password is a permanent password, and the security hold field indicates that there is no security hold on the access account; and granting limited access to change the access password from a temporary password to a permanent password upon receipt of the login request when the login password matches the access password and the access password is a temporary password and, upon a change of the access password from the temporary password to a permanent password:

granting access if the security hold field indicates that there is no security hold on the access account; and denying access if the security hold field indicates that there is a security hold on the access account.

2. A computer readable storage medium storing computer-executable instructions for controlling at least one computer system to perform a method of controlling access to an interaction context of a multi-user application, the method comprising:

receiving a change of password request pertaining to one of a plurality of user accounts of a virtual application instance of the multi-user application, the change of password request including a new password and each user account including a user password;

maintaining a database comprising user account records, each user account record including a password state field indicating whether the user password is a temporary password or a permanent password and a security hold field indicating whether a security hold has been placed on the user account by an administrator; and changing the user password to the new password and setting the password state field to indicate that the user password is a permanent password, and subsequently:

denying the user access to the interaction context if the security hold field indicates that there is a security hold on the user account; and granting the user access to the interaction context if the security hold field indicates that there is no security hold on the user account.

3. A server computer comprising:
at least one virtual application instance;
an instance database for each virtual application instance including one or more user records, each user record containing login data for accessing an associated user account of the virtual application instance and including a user ID, a user password, a password state field indicating whether the user password is a temporary password or a permanent password, and a security hold field indicating whether a security hold has been placed on the user account by an administrator;

a login module configured to receive a login request for a virtual application instance from a user including a login ID and a login password, and if the login ID matches a user ID of a user record of the corresponding instance database, configured to:

deny access upon receipt of a login request when the login password fails to match the user password;

deny access upon receipt of a login request when the login password matches the user password, the password state field indicates that the user password is a permanent password, and the security hold field indicates that there is a security hold on the user account;

grant access upon receipt of a login request when the login password matches the user password, the password state field indicates that the user password is a permanent password, and the security hold field indicates that there is no security hold on the user account; and grant limited access to the user to change the user password from a temporary password to a permanent password upon receipt of a login request when the login password matches the user password and the user password is a temporary password; and a change of password module configured to receive a change of password request for a virtual application instance pertaining to a user including a new password and configured to change the access password from the temporary password to the new password and set the password state field to indicate that the user password is a permanent password, and the login module subsequently configured to:

grant access to the virtual application instance if the security hold field indicates that there is no security hold on the access account; and deny access to the virtual application instance if the security hold field indicates that there is a security hold on the access account.

4. The method of claim 1, comprising:
requesting, after a change of the access password from a temporary password to a permanent password, that the administrator be contacted when the security hold field indicates that there is a security hold on the access account.

5. The computer readable storage medium of claim 2, wherein the method further comprises:

informing a user, after changing the user password to the new password, that a security hold is on the user account; and prompting the user to contact the administrator to have the security hold lifted.

6. The server computer of claim 3, wherein the change of password module is further configured to:

inform the user that a security hold is on the user account; and prompt the user to contact the administrator to have the security hold lifted if the security hold field indicates that there is a security hold on the user account.

* * * * *